Fig.1.

INVENTOR.
CHARLES H. PRESCOTT, Jr.
BY
ATTORNEY.

INVENTOR.
CHARLES H. PRESCOTT, Jr.

May 19, 1953  C. H. PRESCOTT, JR  2,639,074
IMPLEMENT FOR USE IN CHEMICAL APPARATUS
Filed April 25, 1946  7 Sheets-Sheet 4

INVENTOR.
CHARLES H. PRESCOTT, Jr.
BY
ATTORNEY.

Fig. 9.

INVENTOR.
CHARLES H. PRESCOTT, Jr.
BY
ATTORNEY.

Patented May 19, 1953

2,639,074

UNITED STATES PATENT OFFICE 2,639,074

IMPLEMENT FOR USE IN CHEMICAL APPARATUS

Charles H. Prescott, Jr., Berkeley, Calif., assignor to the United States of America as represented by the United States Atomic Energy Commission Application April 25, 1946, Serial No. 664,956

9 Claims. (Cl. 226—82)

This invention relates to apparatus for packaging, and especially to apparatus for closing, in the substantial absence of air, receptacles containing material that is rapidly decomposed or otherwise affected deleteriously when exposed to ordinary atmospheric conditions. More particularly, it appertains to apparatus for the purification of, and to the filling of receptacles with, a uranium chloride, and to apparatus for hermetically sealing the filled receptacles under vacuum conditions.

There is a present need for large quantities of the uranium isotope having mass number 235. Uranium as obtained from natural sources comprises the aforementioned isotope mixed with two others having the mass numbers 234 and 238, in the ratio $U^{234}:1::U^{235}:120::U^{238}:16,700$.

An apparatus capable of effecting a separation of desired components from a mixture of these isotopes is called a "calutron." Such a calutron essentially comprises means for vaporizing a quantity of material containing an element (for example, uranium) which is to be enriched with a selected one of its plurality of isotopes; means for subjecting the vapor to ionization, whereby at least a portion of the vapor is ionized causing ions of the several isotopes of the element to be produced; electrical means for segregating the ions from the un-ionized vapor and for accelerating the segregated ions to relatively high velocities; electromagnetic means for deflecting the ions along curved paths, the radii of curvature of the paths of the ions being proportional to the square roots of the masses of the ions, whereby the ions are concentrated in accordance with their masses; and means for de-ionizing and collecting the ions of the selected isotopes thus concentrated, thereby to produce a deposit of the element enriched with the selected isotope.

The device for supplying the vapor of a material, such as a uranium compound, that is to be treated in a calutron in the aforementioned manner ordinarily comprises a heater with a tubular chamber in which is set a vaporizing vessel or receptacle, commonly called a "charge bottle," containing a charge of a uranium compound that volatilizes readily upon heating. Uranium hexachloride, which can be satisfactorily sublimed at about 100° C. under $10^{-4}$ mm. mercury vacuum, has been found to be especially suitable for charging these devices. Likewise, uranium tetrachloride, although normally less volatile than the hexachloride, is suitable for this purpose. However, both uranium tetrachloride and uranium hexachloride are hygroscopic and decompose when exposed to ordinary atmospheric conditions.

For example, when uranium hexachloride is loaded into a charge bottle under ordinary atmospheric conditions, the uranium hexachloride particles usually become covered with a coating, probably uranyl chloride ($UO_2Cl_2$). This coating impedes volatilization, thereby necessitating higher vaporizing temperatures which, in turn, induce decomposition of the charge to relatively less volatile uranium compounds.

Accordingly, particular care must be taken to exclude air when loading the charge material, such as one of the foregoing uranium chlorides, into the charge bottle for use in the calutron. One form of apparatus that has been devised for performing the receptacle filling operation, in conjunction with apparatus for preparing and/or purifying the uranium chloride to be charged, is described and claimed in the copending application of Charles H. Prescott, Jr., Serial No. 552,556, filed September 2, 1944, now Patent No. 2,574,842. However, while the apparatus disclosed in this copending application is admirably adapted for its intended purpose, it is inherently incapable of charging the receptacles or charge bottles with uranium chloride, or other material sensitive to atmospheric conditions, at a rate as high as could be desired. By the very nature of the apparatus, the receptacle charging and sealing operations are performed successively upon a single receptacle or charge bottle, from which it inherently follows that the apparatus is not of a particularly high capacity, in terms of receptacles charged and sealed per unit time.

Accordingly, the present invention has for an object an improved apparatus for the vacuum packaging of a hygroscopic material such as hygroscopic uranium compounds. Other objects are to provide apparatus capable of filling and sealing calutron charge bottles under vacuum conditions at a substantially enhanced rate, to provide a satisfactory apparatus for purifying and packaging uranium compounds under vacuum, and to seal hermetically vacuum containers charged with uranium compounds or other compounds of a hygroscopic nature, and at an enhanced rate. Other objects are the prevention of deterioration during preparation, purification, packaging, storage, transportation, etc., of uranium tetrachloride and uranium hexachloride while undergoing processing in apparatus of enhanced capacity. Further objects are the provision of apparatus capable of permitting receptacle charging operations to be conducted simultaneously with receptacle sealing operations, whereby the purification of a relatively volatile uranium chloride and the charging thereof into one or more suitable storage receptacles may be conducted simultaneously with the sealing of one or more other storage receptacles containing a charge of the given material produced during a previous cycle of operation of the apparatus. A still further object of the invention is the provision of a Wilson-seal arrangement that is capable of converting rectilinear motion substantially in the direction of the axis of the Wilson-seal to rectilinear motion at an angle to the axis of the Wilson-seal. As used herein the term, "Wilson-seal," is intended to refer generally to the type of seal disclosed in Review of Scientific Instruments, vol. 12 (1941), pages 91 to 93.

In accordance with this invention, apparatus has been devised for packaging a volatile, hygroscopic substance, such as certain uranium compounds, comprising an arrangement for charging one of a number of containers with the given substance, while simultaneously hermetically sealing another of the containers, all of the operations being conducted without exposing the hygroscopic substance to the atmosphere.

An apparatus suitable for purifying and packaging the hygroscopic uranium compound or other substance with a substantially enhanced throughput of material per unit time comprises, in conjunction with a subliming chamber having a condensing chamber associated therewith, a plurality of storage receptacles and a conduit connecting the condensing chamber with one of the storage receptacles, means for heating the subliming chamber whereby the uranium compound is sublimed into and condensed in the condensing chamber, means for removing the sublimed and condensed uranium compound from the condensing chamber and for passing it into the conduit and the storage receptacle, and means for supporting a plurality of storage receptacles; the last-named means including an arrangement having a rotatable turret comprising a receptacle filling station and a receptacle sealing station, means for moving a previously charged receptacle from the filling station to the sealing station to be sealed and for simultaneously moving a receptacle to the filling station to be filled with fresh material, and means for hermetically sealing the filled receptacles.

As an auxiliary feature of the invention there is also provided a Wilson-seal arrangement disposed at an angle to a conduit through which passes material undergoing processing, the Wilson-seal having an operating rod of such a curvature that movement of the operating rod along the axis of the seal causes a predetermined point or portion of the operating rod to move substantially in a straight line at the aforementioned angle to the Wilson-seal axis, and hence substantially longitudinally with respect to the axis of said conduit.

How the foregoing objects and related ends are accomplished will be apparent from the following description including the principle, the organization and various embodiments of the invention, and the best mode contemplated for carrying out the same. The description is amplified by the accompanying drawings, in which.

Figure 1:
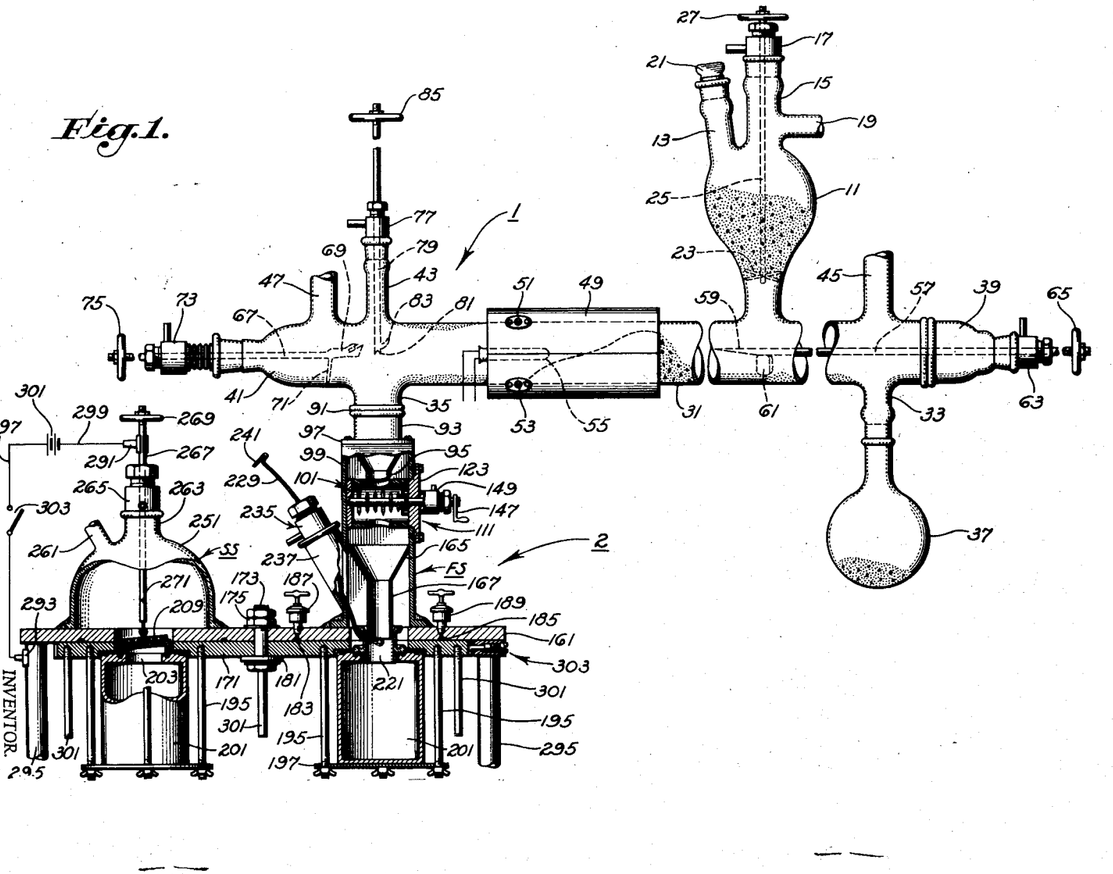
Figure 1 is a side elevational view, partly in section, of a combined charge purifying and receptacle filling and sealing apparatus embodying the features of the invention.

Referring now to Fig. 1 of the drawings, there is illustrated a charge purifying apparatus indicated generally by the reference numeral 1, associated with a sealing arrangement represented generally by the reference numeral 2. The purifying portion of the apparatus may be identical to that described and claimed in the prior Prescott application, Serial No. 552,556, referred to above. However, since this portion of the apparatus forms no part of the present claimed invention, it will be described only in sufficient detail as to render clear the operation of the apparatus as a whole, leaving those interested to refer to the aforesaid Prescott application for any further details that might be desired.

In brief, the purifying apparatus is constructed largely of glass and includes a hopper 11 in which the material to be processed is disposed prior to starting the purifying operation. This hopper 11 is provided with a conduit 13 through which it is filled with raw material, a tubular extension 15 designed to receive a conventional Wilson-seal 17, and a duct 19 for connection to suitable vacuum-producing apparatus (not shown). A removable plug 21 fitting tightly in the conduit 13 seals this part of the apparatus against access to the atmosphere.

Raw material is released from the hopper as desired by means of a suitable feeding device comprising a stainless steel disk-like gate 23 which is carried by an operating rod 25 of the Wilson-seal 17, and which is operated by the hand wheel 27. It will be understood that rotation of the hand wheel 27 produces rotation of the gate 23 which thereupon functions like a feed screw to release material to be processed from the hopper in conventional manner.

The hopper 11 is connected to a subliming chamber or kiln 31 to which the raw material is delivered by gravity when released by the gate 23. The chamber 31 has two downwardly extending delivery ducts or tubes 33 and 35. The sublimed and purified material is transmitted to a charge bottle or other receptacle positioned in an appropriate manner in the sealing portion of the apparatus, indicated generally by the reference numeral 2, through the tube 35, while unsublimed material is discharged through the tube 33 to a receptacle 37 connected thereto. The container 31 also has tubular extensions 39, 41 and 43 constituting portals for the devices that manipulate the materials being processed, and two ducts 45 and 47, located exteriorly of the path of the material as it is processed, for connection to apparatus capable of producing a vacuum of the order of at least $10^{-4}$ mm. Hg within the subliming chamber and zones communicating therewith.

Near its center the horizontally disposed container 31 has a subliming zone proper which is surrounded by a furnace 49. This furnace may consist of two semi-cylindrical electrical resistance heaters capable of raising the material being processed to its volatilization temperature. The temperature commonly reached in subliming uranium hexachloride in this apparatus is about 150° to 180° C., or even as high as 210° C. The heaters have individual electrical connections 51 and 53 for connection to a source of heating current. The heater sections are constructed in such manner as to provide space for a thermocouple well 55. The thermocouple therein (not shown) is connected by suitable conductors to an indicating and/or recording instrument, such as a potentiometer or voltmeter (not shown), which may be suitably calibrated to indicate and/or record directly in terms of the temperature prevailing with the subliming zone.

For moving material inside the vessel 31 at the feeder end, an implement comprising a rod 57 carrying a chisel 59 and a hoe 61 is provided. To insure adequate rigidity this rod should be about ¼″ in diameter. The rod 57 extends through a conventional Wilson-seal 63 in the tubular extension 39, and carries on its external end a hand wheel 65 by which the implement is suitably manipulated.

At the delivery end of the container 31, in the tubular extension 41, there is provided a similar material manipulating arrangement comprising a rod 67 carrying a chisel 69 and a scraper blade 71, thereby permitting the operator to scrape sublimate from the wall surface of the container 31, as well as to split the deposits away from the wall. The rod 67 extends through an improved Wilson-seal 73, and carries exteriorly of the container 31 a hand wheel 75 by which the device is manipulated. The improved Wilson-seal 73 is of a new design described not only in the copending application of Charles H. Prescott, Jr., referred to above, but also in U. S. Patent 2,442,622 to Starr issued June 1, 1948. This Wilson-seal includes an arrangement having a swivel joint, thereby permitting more than the usual (12°) deflection for the rod 67.

The tubular extension 43 on top of the container 31 carries a conventional Wilson-seal 77 provided with an operating rod 79 having a pointed and/or notched end 81 and, adjacent thereto, a small hook 83 pointing in substantially the opposite direction. The hand wheel 85 at the exterior end of the operating rod is utilized for imparting suitable movement to the device from without.

Figure 2:
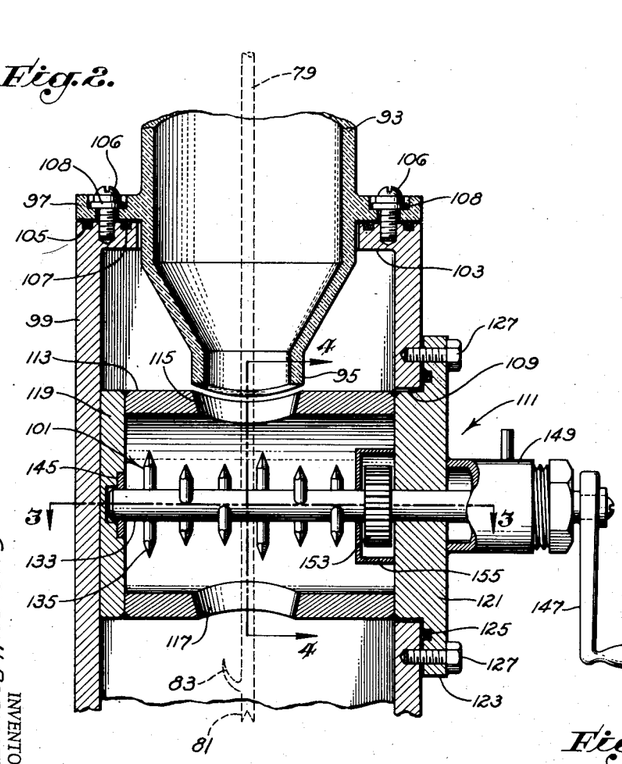
Fig. 2 is an enlarged side elevational view, partly in section, of a crushing device that communicates with the discharge conduit of the condensing end of the charge purifying apparatus.
Figure 9:
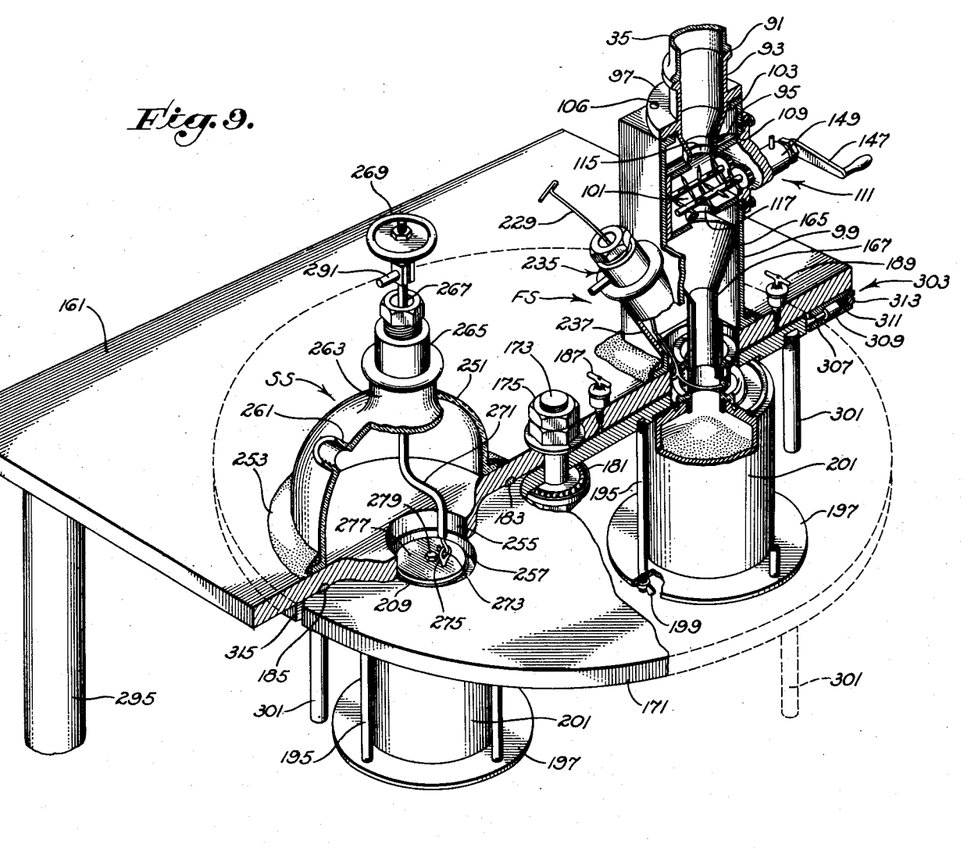
Fig. 9 is an isometric view, partly in section, showing in greater detail the manner of assembly of the rotating turret having the receptacle filling and receptacle sealing stations.

Referring now to Figs. 1, 2 and 9, and especially Fig. 2, the discharge duct 35 from the container 31 is connected by means of a seal 91 to an extension 93 which terminates in a restricted throat portion 95 and carries a flange 97. This flange portion 97 of the extension 93 is attached in a gas-tight manner to a stainless steel housing 99 for the crushing device 101 shown in detail in Figs. 2, 3, 4 and 9. The housing 99 is provided at its upper part with an inturned flange 103 which cooperates with the flange 97 in forming the gas-tight seal previously mentioned. The upper portion of flange 103 is provided with two annular grooves 105 and 107 in each of which is disposed suitable packing material for completing the gas-tight seal. The two flanges are held together by a series of fastening elements such as screws 106 suitably spaced about the periphery of the flange 97. Lock washers 108 may be provided to assist in maintaining a tight closure by the screws 106.

Figure 3:
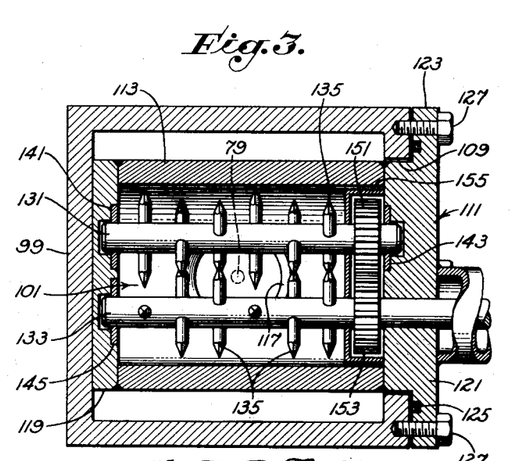
Fig. 3 is a plan sectional view taken along the line 3—3 of Fig. 2.

As shown more clearly in Figs. 3 and 9, the housing 99 is rectangular in cross-section, and is provided with an aperture 109 in a side wall thereof into which is fitted the crushing unit 111. This crushing unit comprises a cylindrical casing 113 which is provided with two diametrically opposed apertures 115 and 117 adapted to register in substantially vertical alignment with the restricted nozzle portion 95 of the tubular extension 93. The inner end of the casing 113 is closed by a plate 119 which may be welded thereto, while the outer end of the casing 113 is sealed by a plate 121 which likewise may be sealed onto the casing 113 by welding. The plate 121 is provided with an annular flange 123 by means of which the entire crushing unit is secured in place within the housing 99. In order to render gas-tight the seal between the housing 99 and the crushing unit 111, the inner surface of the flange 123 that engages the outer surface of the housing 99 is provided with an annular groove 125 carrying suitable packing material in a well-known manner. The flange 123 is secured to the housing 99 by a series of fastening devices such as bolts 127 suitably spaced about the periphery of the flange 123.

Figure 4:
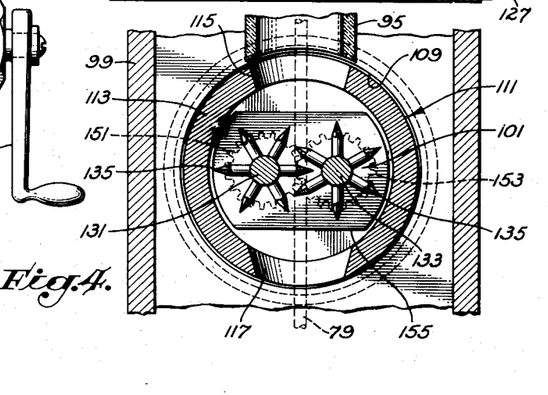
Fig. 4 is a sectional elevational view taken along the line 4—4 of Fig. 2.

The crushing elements proper of the device 101, as shown more clearly in Figs. 3 and 4, comprise a pair of shafts 131 and 133 each of which carries a plurality of short, radially disposed rods 135 secured thereto, the outer ends of which are milled, turned and/or ground to sharp points and subsequently hardened in a conventional manner. These short rods are suitably disposed about the shafts 131 and 133 at suitable intervals, being spaced along the length of the shafts as well as about the periphery of each of the shafts, so that they act conjointly upon lumps or granules of material passing through the casing 113 whereby such lumps or granules may be suitably reduced to a predetermined maximum size depending upon the arrangement of the short rods 135 upon the shafts 131 and 133. In the particular arrangement shown for purposes of illustration, the short pointed rods 135 comprise six pairs spaced more or less equidistantly along the length of each of the shafts 131 and 133, each succeeding pair on a given shaft being displaced by an angle of approximately 120° from the previous pair, the points of attachment for each pair on one shaft being spaced similarly to the points of attachment for another pair on the opposite shaft. Care is taken when assembling shafts 131 and 133 to insure that proper clearance is provided, so that the short pointed rods will not interfere with each other upon rotation of the shafts. It will also be noted, from Figs. 2 and 3, that care is taken to space the short rods 135 along the shafts 131 and 133 in such manner as to provide adequate clearance for the operating rod 79 carrying hook 83, thereby permitting this rod readily to pass through and between the shafts 131 and 133 without interference.

The shaft 131 is journaled in bearings 141 and 143 disposed respectively in the plates 119 and 121. The shaft 133 is journaled at its inner end in a bearing 145 disposed in plate 119, while its outer end passes completely through the plate 121, thereby permitting attachment to a crank 147 which permits manual operation of the crushing device from without the apparatus. The shaft 133 thus constitutes a drive shaft. The outer end of the shaft 133 that passes through the plate 121 is surrounded by a Wilson-seal 149 (see Figs. 1, 2 and 9) which may be of conventional type, thereby permitting suitable operation of the crushing unit 111 without breaking the vacuum obtaining within the entire apparatus. In order to transmit motion from the drive shaft 133 to the other shaft 131, the shafts 131 and 133 have affixed thereto meshing spur gears 151 and 153, respectively. These gears are enclosed within a suitable gear housing 155 sealed to the inner surface of plate 121, thereby preventing particles of solid material that pass through the crushing unit from falling into and between the meshing gears and thereby interfering with the smooth operation thereof.

Figures 5, 6, 7:
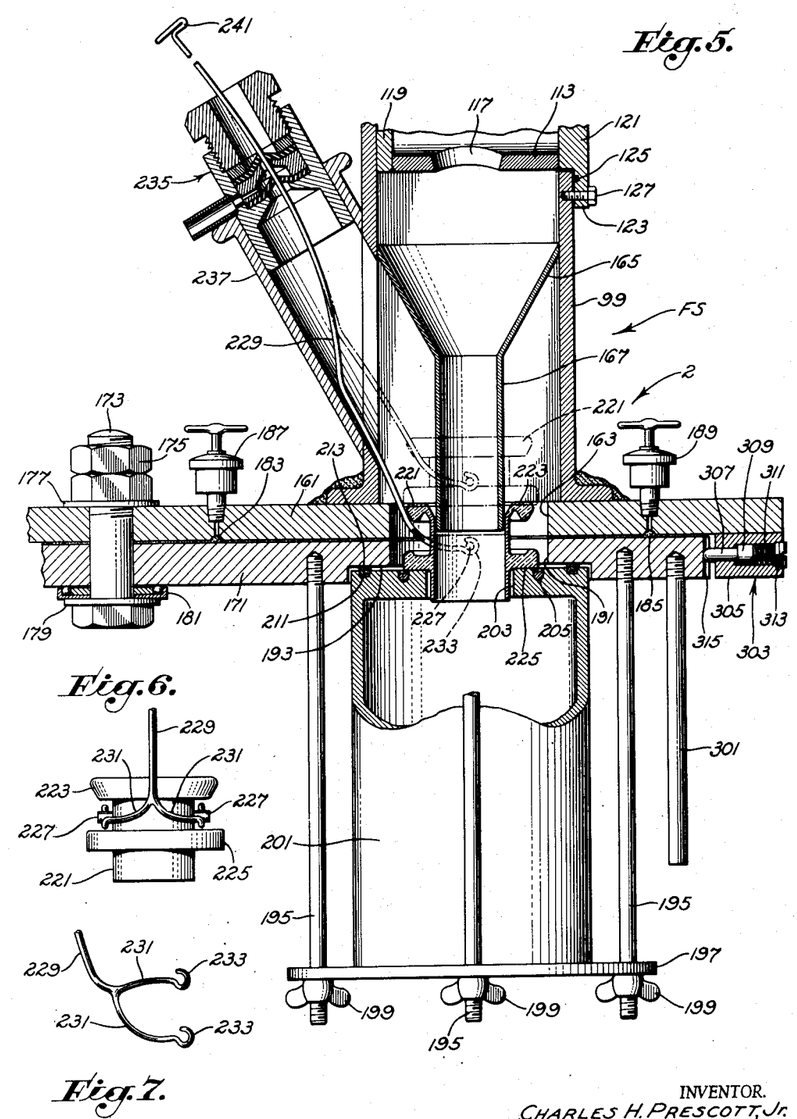
Fig. 5 is a sectional elevational view of the charge filling portion of the apparatus shown in Fig. 1, showing in greater detail the Wilson-seal arrangement which represents an auxiliary feature of the invention.
Fig. 6 is a view showing a detail of the connection between the operating end of the Wilson-seal rod and the manner in which it is connected to a telescoping spout arrangement associated with the discharge conduit.
Fig. 7 is a detail showing the shape of the end of the operating rod of the Wilson-seal arrangement.

Referring now to Figs. 1, 5 and 9, and more particularly to the details of the apparatus shown on an enlarged scale in Fig. 5, the housing 99 for the crushing device 101 is secured in a suitable manner, such as by welding, to a plate 161 to which is attached the rotary turret which comprises one or more receptacle filling stations FS and one or more receptacle sealing stations SS. At the filling station FS the plate 161 is provided with an aperture 163 which is substantially concentrically arranged with respect to the tubular portions 43, 35 and 93 of the apparatus, as well as with respect to the central vertical axis of the housing 89. Situated within the housing 99 is a funnel arrangement 165, preferably disposed with the mouth of the funnel sealed to the interior of the housing 99, whereby all material passing through the housing 99 from the crushing device 101 will be caught thereby, and directed through the nozzle 167 of the funnel. The nozzle 167 is located substantially concentrically with respect to the aperture 163, its end extending into the aperture but stopping short of the lower face of the plate 161, thereby affording ample clearance for the rotary movement of cooperating parts presently to be described.

Below the plate 161, and attached thereto in such manner as to readily permit it to rotate about its axis, is a circular plate 171 constituting a rotary turret provided with corresponding apertures for alignment with the apertures in the upper plate 161 defining receptacle filling stations and receptacle sealing stations. For this purpose the plate 171 is mounted in a position affording ready rotation thereof by means of the axially located shaft 173, which for convenience may take the form of a large hex-head cap screw. This screw passes through centrally located holes in the plates 161 and 171, and is held securely in position by a pair of cooperating nuts 175 whereby it may be locked against accidental loosening. Washers 177 and 179 are a part of this supporting arrangement as well as a ball bearing member 181 which acts as a thrust bearing for the assembly, and permits easy rotation of the plate 171 when and as desired. In order to provide adequately for lubrication between the engaging surfaces of the cooperating plates 161 and 171, as well as to assist in maintaining substantially vacuum-tight conditions within the portions of the associated apparatus that contain material sensitive to atmospheric conditions, a pair of annular grease rings 183 and 185 (see Fig. 9), concentric with the axis of rotation of the plate 171, are provided in the lower surface of plate 161. In order to supply grease or other lubricant to these grease rings when and as desired, a pair of manually operable grease injectors 187 and 189 are provided. It will be apparent from inspection of Figs. 1 and 9 that the annular grease grooves 183 and 185 are so disposed with respect to the plates 161 and 171 that the operative portions of the apparatus in which vacuum conditions are to be maintained lie between these grease grooves, thereby substantially preventing leakage of air into the vacuum portion of the system.

Referring again more particularly to Fig. 5, the lower rotating plate 171 is provided with an aperture 191 so positioned and of such a size that when the lower plate 171 is properly positioned with respect to the upper plate 161, aperture 191 registers with aperture 163 in plate 161, thereby permitting material undergoing treatment to pass from the housing 99 entirely through the registering apertures in the plates 161 and 171 in a manner to be described more fully hereinafter. The lower face of the plate 171 is provided with a counterbore 193 concentric with the aperture 191, the diameter of the counterbore being slightly in excess of the outer diameter of the charge bottles or receptacles to be filled during operation of the apparatus. The bottom and side wall of the counterbore are thus well adapted to receive and maintain in proper position the open mouth of the receptacle or charge bottle to be filled.

In order to hold the receptacle or charge bottle at the filling station FS, any convenient clamping arrangement may be provided. For example, four or more rods 195, threaded at each end, may be arranged concentrically with respect to the aperture 191 in the lower plate 171. These rods are threaded into tapped holes suitably provided in the lower face of the plate 171, and are slightly longer than the overall length of the receptacles or charge bottles to be filled. In order to hold the receptacles or charge bottles securely in place, there is provided a circular plate 197 of a diameter slightly larger than the diameter of the circle in the circumference of which are positioned the tapped holes into which are threaded the rods 195, this plate being drilled to provide a corresponding arrangement of holes of a diameter slightly larger than the diameter of the rods 195. This plate 197 may be held in place against the bottom or closed end of the receptacles or charge bottles by a series of wing nuts 199, thus assuring the proper positioning of the receptacles or charge bottles at the filling station.

The receptacle or charge bottle 201 is circular in cross section and has a circular opening 203 in the top defining its mouth or charging opening. Surrounding the mouth 203 is an annular groove 205 designed to receive the depending skirt or flange 207 of the cap or closure 209 (see Fig. 8 for the construction of the cap) and an annular groove 211 adapted to contain packing 213 for maintaining vacuum-tight conditions. Ordinarily the mouth 203 and grooves 205 and 211 are located in the top surface of the bottle and concentrically with respect to its axis.

Preferably, the receptacles or charge bottles and their caps are made of stainless steel, for example, 18–8 (18-Cr, 8-Ni; USS No. 316) stock, but other metals not readily attacked by the vapors of uranium halides, or by vapors of such other materials as are being processed, may be used if desired. In order to assist in providing a soldered, gas-tight joint between the cap and the bottle, the groove 205 is preferably coated or plated with a metal easily wet by a low melting alloy, for example, Wood's metal, the latter being particularly well adapted for soldering or securing the cap in position once the filling operation has been performed. The plating (which for example may comprise a noble metal such as silver, gold, etc.) is not shown for the sake of simplicity. These and other details relating to one preferred form of receptacle or charge bottle which is particularly well adapted for use with the present apparatus are set forth more fully in the copending application of Charles H. Prescott, Jr., Serial No. 5,552,556, referred to above, and accordingly no further details need be given here.

Since, as is readily apparent from Fig. 5, there is necessarily an appreciable distance between the end of the delivery nozzle 167 of the funnel 165 which directly receives the subdivided material from the crushing device 101 and the mouth of the receptacle 201 to be filled, and since any small particles of solid material that might be accidentally deflected to the top of the bottle, and particularly into the groove 205 thereof, might seriously interfere with the effective sealing thereof against atmospheric influences, there is provided a telescoping spout arrangement 221 that may be formed of glass or other suitable material not adversely affected by the material undergoing treatment. This spout 221, as shown in greater detail in Fig. 6, comprises an upper annular flange 223 and an annular shoulder 225 located approximately two-thirds of the distance from the top toward the bottom thereof. The annular shoulder 225 is adapted to rest upon the top of the charge bottle 201, the general dimensions and arrangement of the telescoping spout 221 being such that, as the shoulder 225 rests in the position mentioned, the upper portion thereof surrounds the lower end of the delivery nozzle 167, while the lower end of the spout 221 opens into the mouth 203 of the receptacle or charge bottle 201. Accordingly it will be apparent that the telescoping spout 221 affords ready access for the pulverized material falling from the crushing device 101 through the funnel 165 into the receptacle or charge bottle 201 to be filled, without permitting any of the material to be deflected out of the desired path.

When the telescoping spout 221 is in the receptacle filling position at the filling station, as shown in Fig. 5, it will be noted that it is impossible to rotate the lower plate 171. Consequently, in order to retract the telescoping spout out of the way, thereby affording sufficient clearance for rotation of the plate 171, the present invention contemplates as a sub-feature thereof a novel arrangement for effecting this operation. This arrangement comprises a pair of pins 227 (see Fig. 6) projecting laterally a short distance from the intermediate portion of the telescoping spout 221, between the flange 223 and the shoulder 225. An operating rod 229 for lifting the spout 221 is also provided, this rod ending in two branches or forks 231 (see Fig. 7) each provided with a hook 233 for engaging the lifting pins 227.

In order to actuate this operating rod 229 from without the apparatus, thereby avoiding impairment of the vacuum conditions obtaining within the apparatus, the operating rod 229 passes through a Wilson-seal arrangement 235 which per se may be of conventional construction, and the details of which therefore need not be further described. This Wilson-seal is located at the end of a side housing 237 that branches off at an angle from the housing 99. It will be apparent by inspection of Figs. 1, 5 and 9 that, in order to cause the desired movement of the telescoping spout 221 up and down in the direction of the axis of the housing 99, it is not possible to use an ordinary straight Wilson-seal operating rod, since the operating rod 229, which can only be moved back and forth more or less longitudinally with respect to the Wilson-seal 235, is disposed in the housing 237 at an angle to the axis of the housing 99. It is therefore a sub-feature of the present invention to provide an operating rod 229 for a Wilson-seal of otherwise conventional design, so shaped that movement of the operating rod in a direction substantially longitudinally of the axis of the Wilson-seal will cause displacement of a predetermined point on the operating rod in a substantially straight line at an angle to the axis of the Wilson-seal. It has been discovered that an operating rod capable of functioning in this manner must conform in curvature to a rather complicated mathematical formula, and for the sake of continuity the development of this formula will be left for a later portion of this description, it being sufficient here to state merely that the operating rod 229 (or more strictly speaking, the portion thereof which, during operation of the device, passes through the sealing elements proper of the Wilson-seal) must be shaped so as to conform substantially to the curve corresponding to an equation to be derived hereinafter.

With a Wilson-seal mechanism provided with an operating rod 229 shaped in the manner mentioned, motion applied in a direction more or less longitudinally of the axis of the Wilson-seal is converted at a predetermined point along the operating rod into straight line motion at a predetermined angle to the axis of the Wilson-seal, the construction and arrangement in this case being such that the said predetermined point of the operating rod corresponds to the point of attachment between the hooks 233 and the pins 227 (Figs. 5, 6 and 7), whereby appropriate motion at the handle 241 of the operating rod 229 in a direction substantially longitudinally of the axis of the Wilson-seal causes the telescoping spout 221 to be lifted from the filling position shown in Fig. 5 to a retracted position by virtue of which the bottom of the spout 221 is elevated an appreciable distance above the plane of the upper surface of the lower plate 171, thereby providing adequate clearance for rotation of the latter.

Referring now to the portion of the apparatus arrangement comprising the sealing station SS for hermetically sealing the receptacles or charge bottles 201 after they have been filled to the desired extent with the material undergoing processing, as shown generally in Figs. 1 and 9 (and in greater detail in Fig. 8) the sealing station comprises a housing 251, preferably formed of glass in order to permit visual inspection of the manipulations that are carried out therein. This housing is secured to the fixed top plate 161 of the apparatus in any desirable manner, for instance by the use of a suitable sealing material such as De Khotinsky cement 253 applied to the joint between the housing and the plate, thereby making a gas-tight joint. There are formed in the plates 161 and 171 a pair of corresponding aligned apertures 255 and 257, respectively, the axis of each of which lies the same distance from the axis of the central supporting shaft 173 as does the axis of each of the apertures 163 and 191 in the plates 161 and 171 at the filling station FS (Fig. 5). By virtue of this arrangement it follows that, as the lower plate 171 is rotated, the receptacles or charge bottles 201 supported against the lower surface of the plate 171, and so positioned that their mouths are in alignment with the corresponding apertures in the plate, may be brought at will into registering position with the passageways defined by the apertures 163 and 191 at the filling station FS, and by the apertures 255 and 257 at the sealing station SS.

Figure 8:
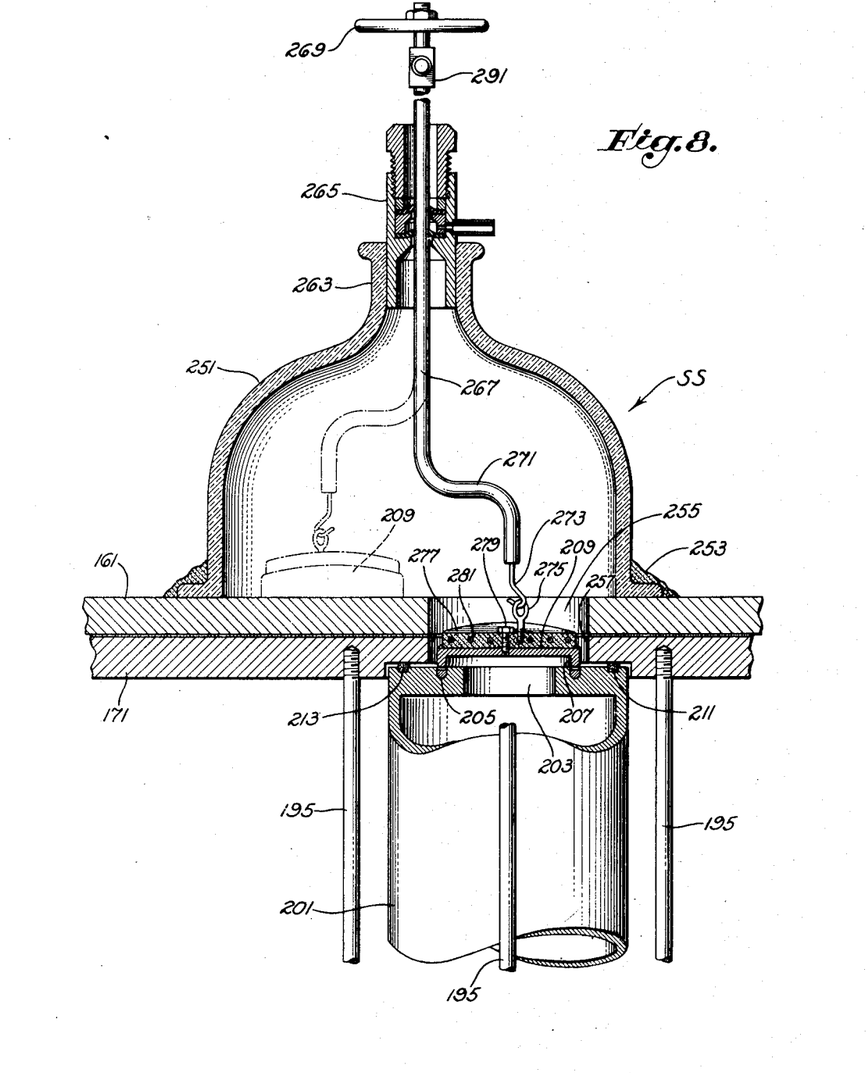
Fig. 8 is an enlarged elevational view, partly in section, of the charge sealing portion of the apparatus shown in Fig. 1.

As shown in Figs. 8 and 9, the aligned apertures 255 and 257, while they are located the same distance from the central supporting member 173 as are the apertures 163 and 191, are displaced somewhat from the axis of the housing 251, this displacement being somewhat in excess of half the diameter of the apertures. This displacement from the axis of the housing 251 of the apertures 255 and 257 permits carrying out within the housing certain manipulations necessary to the sealing operation, as described more fully hereinafter.

The receptacles or charge bottles 201 are supported in a vacuum tight manner against the under side of the rotary plate 171 in the same manner as that already described in connection with the filling station arrangement, and hence for the sake of brevity the structural details of the supporting arrangement need not be further described.

In order to carry out the sealing operation while maintaining the apparatus under the desired conditions of vacuum, the housing 251 is provided with a conduit 261 (Figs. 1 and 9) communicating with a vacuum producing device (not shown) of sufficient capacity to produce and maintain the desired vacuum therein. The upper end of the housing 251 comprises a tubular extension 263 into which there is inserted a Wilson-seal 265 that may be conventional in arrangement and operation. This Wilson-seal is provided with an operating rod 267 that passes through the seal, the outer end terminating in a threaded portion to which is attached a hand wheel 269 to enable the device to be operated from without the apparatus. The operating rod within the housing 251 is provided with an offset portion 271 that terminates in a hook 273 adapted to engage an eyelet 275 that is securely attached to the structure of the receptacle cap or closure 209 previously referred to.

The cap 209 is provided with an electric heating element 277 detachably secured thereto by means of a screw fastener 279, the heating element comprising an electric resistance such as Nichrome wire 281 suitably embedded in a refractory and electrically insulating material and having one end grounded to the closure 209 and hence to the apparatus proper by virtue of the fact that the receptacle or charge bottle 201 is fabricated of a suitable metal such as stainless steel while the clamping arrangement that secures the receptacle to the rotary plate 171 likewise is fabricated of metal. The other end of the resistance 281 is connected to the eyelet 275, which thus becomes a terminal post of the heating element. The circuit for the heating element is completed through the metal hook 273, the operating rod 267 and any suitable external circuit such as that shown for illustrative purposes in Fig. 1. Thus as there shown, two metal contactors 291 and 293 are secured to the operating rod 267 and to one of the metal supporting legs 295, respectively, the latter being connected by suitable conductors 297 and 299 to a battery or other current source 301, a suitable switch 303 being provided to energize and de-energize the heating circuit at will.

Since the particular method of hermetically sealing the receptacle closure 209 to the filled receptacle 201 forms no part of the present invention, it need not be described at this point other than to state that the heat generated by operation of the electric heating element 281 melts the Wood's metal (or other soldering material) that previously has been placed in the groove 205 of the receptacle 201, and which Wood's metal, upon cooling after de-energizing the heating circuit, solidifies and forms the desired seal between the receptacle and its closure. For further specific details of the structure and operation of the sealing arrangement for the individual receptacles or charge bottles, reference may be had to the prior copending application, Serial No. 552,556, referred to above.

It will be noted from Fig. 8 that the offset portion 271 of the operating rod 267 permits of the necessary manipulation of the receptacle closures 209 away from and into sealing position as desired. The operations of removing the sealed filled receptacles, and of replacing the sealed receptacles so removed with fresh empty receptacles to be filled are readily performed at the sealing station; it being only necessary, before clamping in place at the sealing station a fresh empty receptacle to be filled subsequently at the filling station, to take care to suspend from the hook 273 a new closure 209, properly pretreated for the subsequent sealing operation. The operating rod 267 may be actuated in such manner as to rest the closure 209 upon the upper surface of the plate 161 located within the housing 251, as shown in dotted lines in Fig. 8. Thereafter, having clamped in place an empty receptacle to be filled, and having operated the vacuum producing device communicating with the interior of the housing 251 for a sufficient period of time to bring the pressure obtaining within the housing down to the desired value, the sealing station SS is ready to receive a freshly filled receptacle from the filling station whenever the filling operation has been completed, this being brought about simply by suitably rotating the plate 171.

The apparatus as a whole may be supported in large part at least by a plurality of legs 295 (see Figs. 1 and 9) which are suitably attached to the top plate 161 near its corners.

The rotation of the plate 171 to which are secured in a vacuum tight manner the several receptacles 201—both those filled and ready to be sealed as well as those empty and ready to be filled—may be brought about in any convenient manner. For example, there may be provided a series of rods 301 (Figs. 1 and 5) one end of each of which is threaded into tapped holes located in the lower surface of the rotary plate 171 near the periphery thereof, so that by grasping these rods 301 the lower plate may be rotated manually in a convenient manner when and as desired.

In order to locate automatically the proper points at which to stop the rotation of the plate or turret 171 during operation of the device, as well as to assist in holding the plate 171 in the proper position at which the apertures 163 and 191 on the one hand, and apertures 255 and 257 on the other hand, are maintained in substantial alignment, there is provided a positioning device 303 (Figs. 5 and 9) which suitably may take the form of a latch mechanism. As shown in detail in Fig. 5, this latch mechanism includes a latch block 305 secured to the under side of the top fixed plate 161, and spaced slightly from the outer periphery of the rotary plate or turret 171. The block 305 is drilled and counterbored to receive a positioning pin 307 having a slightly enlarged head 309 which is urged toward the bottom of the counterbore by a spring 311, this spring being maintained under compression by a headless set screw 313 that engages and is held in place in a threaded portion of the counterbore of the block 305. Accordingly the inner end of the pin 307 is caused to project beyond the block 305 toward the axis of rotation of the rotary plate 171. At predetermined intervals about the periphery of the rotary plate 171 there are provided a plurality of V-shaped notches 315 into which the end of the pin 307, which end may be suitably tapered or pointed, is urged by the action of the compression spring 311 as the plate 171 is caused to rotate. In this manner, as the plate or turret 171 rotates, the end of the pin 307 is forced into one of the V-shaped notches 315 corresponding to a point during the rotation at which the apertures in the plates 161 and 171, at both the filling station or stations as well as at the sealing station or stations, come into substantial alignment. Furthermore, due to the force exerted by the compression spring 311 bearing against the head of the pin 307, any undesirable tendency of the plate 171 to rotate slightly out of the proper predetermined position during the filling and/or sealing operations is greatly minimized, if indeed not entirely eliminated.

It will be understood that any other desired latching device may be employed in place of the particular arrangement shown for illustrative purposes.

Figure 10:
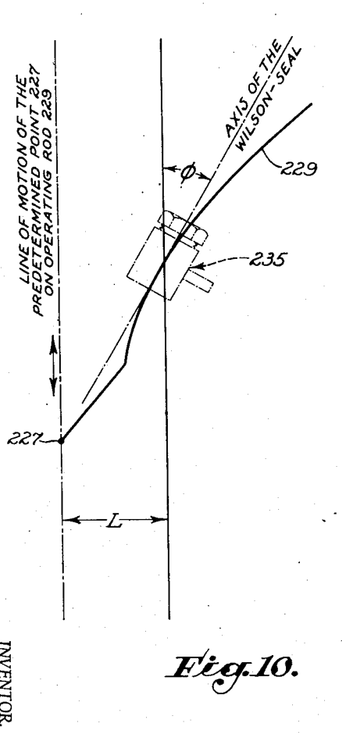
Figs. 10, 11 and 12 are diagrams relating to the mathematical development of the curvature of the operating rod comprising the Wilson-seal arrangement shown in detail in Fig. 5.
Figure 11:
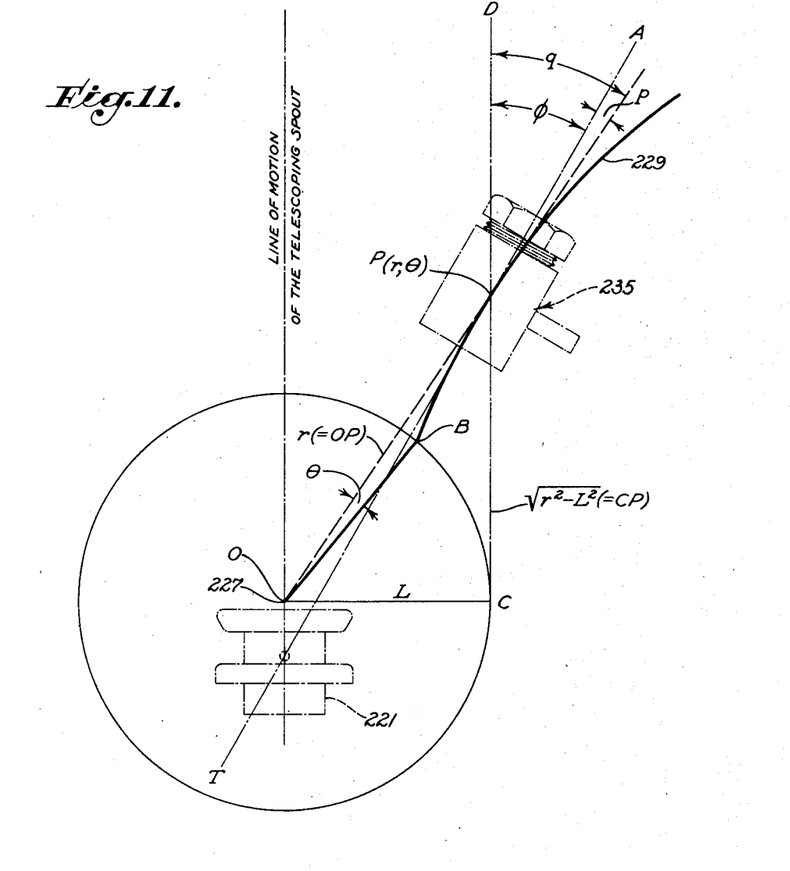
Figure 12:
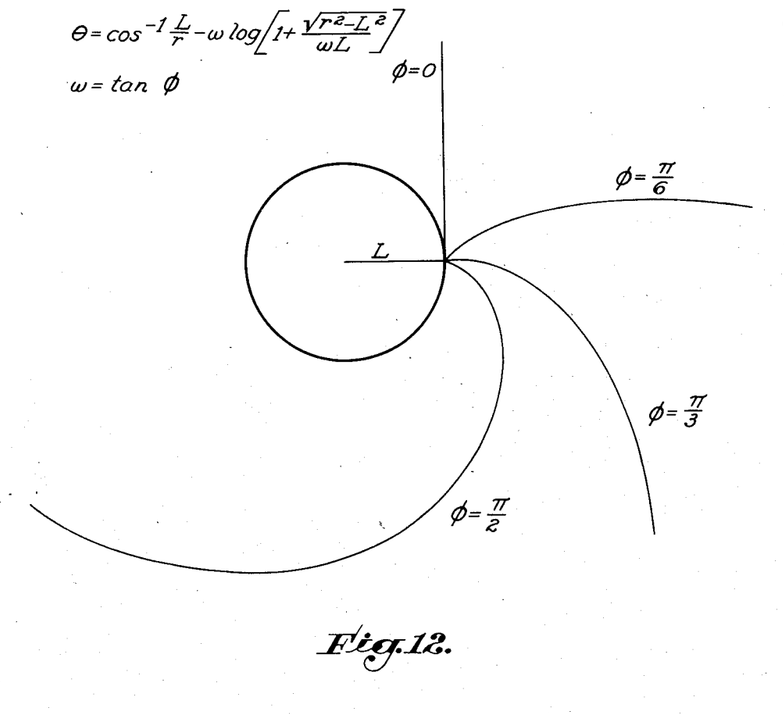

Returning to the considerations which govern the shape of the operating rod 229 that passes through the Wilson-seal 235 (see Fig. 5) in order that, upon suitable manipulation of the operating rod in a direction substantially longitudinal of the axis of the Wilson-seal, a predetermined point of the operating rod shall move in a substantially straight line lying at a predetermined angle to the axis of the Wilson-seal, reference may be had to Figs. 10, 11 and 12.

Fig. 10 shows schematically the general arrangement of the Wilson-seal and its operating rod. The curved operating rod 229 is always tangent to the axis of the Wilson-seal and the free end 227 (which is to be regarded as a predetermined point of attachment to the telescoping spout 221—see Fig. 5) moves substantially in a vertical straight line when the rod 229 is operated from without in the usual manner. The angle $\phi$ is defined as the angle between the vertical and the outward direction (i. e., the axis) of the Wilson-seal, and of course has a fixed predetermined value for any given apparatus arrangement.

For greater ease of mathematical treatment, these conditions may be referred to a frame of reference in which the operating rod 229 is assumed to be fixed, and the point of attachment 227 is taken as the origin. The conditions defining the curvature of the operating rod are then that a tangent to the curve makes, at its point of tangency, the angle $\phi$ with a line which passes at a distance L from the origin, i. e., which latter line is also tangent to a circle of radius L about the origin.

This second construction is also shown in Fig. 11, which indicates schematically in somewhat greater detail the mathematical relationship existing between the operating rod 229 and the vertical line of motion of the telescoping spout 221, particularly as regards the point of attachment thereto. For the sake of greater clarity, only those parts are shown which are necessary to an understanding of the configuration of the operating rod; thus the telescoping spout 221, shown in dotted lines, is attached to the operating rod 229 by means of the pins 227 (Fig. 6), the reference numeral 227 being employed in Fig. 11, however, to indicate the position of the pins in the geometry of the system rather than by way of designation of the pins themselves. The operating rod 229 passes through the Wilson-seal 235 likewise shown in dotted lines.

Referring again to Fig. 11, AT is the axis of the Wilson-seal which, in its operating position, makes the predetermined angle $\phi$ with the vertical. P is the point of tangency between the curve representing the operating rod 229 and the axis of the Wilson-seal. L is the predetermined horizontal distance by which the point of tangency P is displaced from the origin O; in other words a circle with its center at the origin O, and of radius L, is tangent to the vertical line CD passing through the point of tangency P. Considering further the point $P_{(r,\theta)}$ the locus of which constitutes the desired curve, it will be apparent from Fig. 11 that, in polar coordinates:

$r$ is the radius vector, i. e., OP
$\theta$ is the corresponding angle
$p$ is the angle between the radius vector and the tangent to the curve at the point P; in this case, the angle between OP and AT
$q$ is the angle between the radius vector and a line tangent to a circle of radius L; in this case, the angle between OP and CD From this construction we have the following relationships:

$$\tan p = r \frac{d\theta}{dr}$$

$$\tan q = L/\sqrt{r^2 - L^2}$$

$$p + \phi = q$$

setting $\tan \phi = w =$ a constant, we have $$\phi = q - p, \text{ from which}$$

$$\tan \phi = w = \frac{\tan q - \tan p}{1 + \tan q \tan p}$$

Hence, $$w = \frac{L/\sqrt{r^2 - L^2} - r \frac{d\theta}{dr}}{1 + \frac{Lr}{\sqrt{r^2 - L^2}} \frac{d\theta}{dr}} \quad (1)$$

For purposes of integration, the variables of (1) may be readily separated and the equation reduced to the following simplified form:

$$d\theta = \frac{L - w\sqrt{r^2 - L^2}}{wL + \sqrt{r^2 - L^2}} \frac{dr}{r} \quad (2)$$

Taking the integral of both sides, there results:

$$\theta = \int \frac{L - w\sqrt{r^2 - L^2}}{wL + \sqrt{r^2 - L^2}} \frac{dr}{r} \quad (3)$$

The right hand member of (3) may be readily integrated by standard methods of the integral calculus, the details of which need not be set forth at this point in the interests of brevity, to give the following equation for $\theta$ in terms of $r$ (it being recalled that $L$ and $w$ are constants the values of which are dependent only upon the predetermined geometry of the general apparatus arrangement):

$$\theta = \cos^{-1}\frac{L}{r} - w \log (wL + \sqrt{r^2 - L^2}) + C \quad (4)$$

The constant of integration, $C$, in (4) is readily eliminated, and the equation incidentally further simplified, by letting $\theta=0$ at the point where $r=L$ (i. e., at the point B in Fig. 11), which is equivalent to making OB the polar axis with respect to the desired curve. Substituting these last-mentioned values in (4), there is obtained:

$$C = w \log wL \quad (5)$$

Whereupon, by eliminating $C$ between (4) and (5), there is obtained for the equation of the desired curve:

$$\theta = \cos^{-1}\frac{L}{r} - w \log\left(1 + \frac{\sqrt{r^2 - L^2}}{wL}\right) \quad (6)$$

The foregoing result, as exemplified by (6), may be checked by simple differentiation thereby resulting in (2).

In Fig. 12 are plotted several of the desired curves for different values of the predetermined angle $\phi$. When $\phi$ equals 0 the curve reduces to a vertical straight line.

It will be noted that for values of $r$ less than $L$, the corresponding values of $\theta$ are expressible as functions of complex variables and hence become only of mathematical interest.

For present purposes the curve as plotted for corresponding values of $\theta$ and $r$ when $\phi$ is taken as $$\frac{\pi}{6}$$

is admirably adapted for use. It may be noted in passing that the operating rod 229 need not conform to the given curve except in the section thereof which is to slide through the Wilson-seal.

It will thus be seen that there has been provided an apparatus capable of achieving the objects of the present invention, namely, an apparatus for packaging and closing in substantial absence of air receptacles containing material that is readily and rapidly decomposed or otherwise affected deleteriously when exposed to ordinary atmospheric conditions, and including an improved Wilson-seal arrangement for converting motion substantially along the axis of the Wilson-seal to rectilinear motion at a predetermined angle to the axis of the Wilson seal.

Probably many apparently widely different embodiments of this invention may be made without departing from the principle, breadth and spirit thereof and it is to be understood, therefore, that this invention is not limited to the specific embodiments thereof except as encompassed in the following claims.

What is claimed is:

1. In apparatus for filling receptacles with a material that tends to decompose upon contact with ordinary atmospheric air, and for hermetically sealing the receptacles so filled, the combination of: a pair of relatively rotatable, superposed plates having aligned apertures defining a receptacle filling station and spacially disposed apertures in alignment defining a receptacle sealing station, means for introducing the material into a receptacle positioned at the filling station, means for simultaneously sealing hermetically another receptacle positioned at the sealing station and previously filled with a desired quantity of the material, and means for moving the freshly filled receptacle from the filling station to the sealing station and for moving an empty receptacle to be filled to the filling station.

2. Apparatus as in claim 1 including a pair of radially spaced, circular grease rings disposed about the axis of rotation of said plates for hermetically sealing the space between the latter and bounded by said rings.

3. Apparatus as in claim 1 including means for removably securing to the rotating portion of the turret the receptacles while being filled and sealed.

4. Apparatus for filling receptacles with a solid material that tends to deteriorate upon contact with moisture, and for hermetically sealing the receptacles so filled, comprising a turret arrangement having a fixed horizontally disposed upper plate cooperating with a rotatably mounted horizontally disposed lower plate, each of said plates being provided with a plurality of apertures arranged equidistantly from the axis of rotation of the lower plate and in such manner that the apertures in the upper plate are adapted to register with the apertures in the lower plate, thereby providing at least one receptacle filling station and at least one receptacle sealing station, means for detachably securing receptacles to the underside of the lower plate in a gastight manner and with the mouths of the receptacles in substantial alignment with the respective apertures in the lower plate, a housing secured in a gastight manner to the upper plate and in substantial alignment with one of the apertures in the upper plate for introducing solid material through the registering apertures of the two plates into a receptacle positioned at a receptacle filling station, and means secured in a gastight manner to the upper fixed plate and in substantial alignment with another of the apertures in the upper plate for simultaneously sealing hermetically a previously filled receptacle positioned at a receptacle sealing station.

5. Apparatus as in claim 4 including a feed conduit for introducing the solid material into the receptacle positioned at the receptacle filling station, a spout telescopically surrounding the lower portion of said conduit and extending downwardly through said registering apertures and into the receptacle to be filled, a hermetic seal disposed adjacent a side wall of said housing and an operating rod extending through said seal into the interior of said housing and attached to the telescoping spout in order at the conclusion of the filling operation to lift the lower end of the telescoping spout at least sufficiently to clear the lower rotatably mounted plate of the turret arrangement.

6. Apparatus as in claim 4 including means associated with at least one of the plates of the turret arrangement for effecting a gastight seal between the plates.

7. Apparatus as in claim 4 including means associated with at least one of the plates of the turret arrangement for effecting a gastight seal between the plates, said gastight sealing means comprising a plurality of annular grooves for lubricant formed in at least one of the opposing surfaces of the plates comprising the turret arrangement and located substantially concentrically with respect to the axis of rotation of the rotatably mounted lower plate, the annular grooves also being located in such manner that an inner one lies entirely within, and an outer one lies entirely without, the aforesaid plurality of apertures that are disposed in the upper and lower plates respectively, and means for introducing lubricant into said annular grooves.

8. Apparatus as in claim 4 including a vertically positioned central shaft located at the axis of rotation of the rotatably mounted lower plate and passing through both the upper plate and the lower plate for securing the plates in assembled relation, and a bearing member associated with the central shaft to assist in supporting the rotatably mounted lower plate and to facilitate rotation thereof during operation of the apparatus.

9. Apparatus as in claim 4 including means for positioning the rotatably mounted lower plate in such manner as to insure substantially registering relation between corresponding apertures in the upper plate and the lower plate respectively, for securing the rotatably mounted lower plate in such position while the filling and sealing operations are being carried out.

CHARLES H. PRESCOTT, Jr.

References Cited in the file of this patent

UNITED STATES PATENTS

| Number | Name | Date |
|---|---|---|
| 283,313 | Wiltse | Aug. 14, 1883 |
| 372,876 | Stickney, II | Nov. 8, 1887 |
| 1,017,663 | Fraser | Feb. 20, 1912 |
| 1,336,030 | Gammeter | Apr. 6, 1920 |
| 1,409,211 | Anderson et al. | Mar. 14, 1922 |
| 1,607,269 | Malmquist | Nov. 16, 1926 |
| 2,162,464 | Soderberg | June 13, 1939 |
| 2,341,498 | Bell | Feb. 8, 1944 |
| 2,477,406 | Church | July 26, 1949 |

FOREIGN PATENTS

| Number | Country | Date |
|---|---|---|
| 577,685 | France | June 11, 1924 |